(12) United States Patent
Röders

(10) Patent No.: US 8,317,440 B2
(45) Date of Patent: Nov. 27, 2012

(54) METHOD FOR VIBRATION-OPTIMIZING A MACHINE TOOL

(75) Inventor: Jürgen Röders, Soltau (DE)

(73) Assignee: P & L GmbH & Co. KG (DE)

( * ) Notice: Subject to any disclaimer, the term of this patent is extended or adjusted under 35 U.S.C. 154(b) by 1155 days.

(21) Appl. No.: 11/914,004

(22) PCT Filed: Apr. 6, 2006

(86) PCT No.: PCT/EP2006/003135
§ 371 (c)(1),
(2), (4) Date: Jul. 29, 2008

(87) PCT Pub. No.: WO2006/122611
PCT Pub. Date: Nov. 23, 2006

(65) Prior Publication Data
US 2009/0013790 A1 Jan. 15, 2009

(30) Foreign Application Priority Data
May 20, 2005 (DE) .......................... 10 2005 023 317

(51) Int. Cl.
*B23Q 5/18* (2006.01)
*B23Q 17/12* (2006.01)
*B23C 1/06* (2006.01)

(52) U.S. Cl. ............ 409/131; 408/143; 408/9; 700/173; 409/141; 409/202

(58) Field of Classification Search .................. 409/141, 409/131, 132, 202, 212; 408/143, 9; 700/170, 700/173, 188; 82/903, 118
See application file for complete search history.

(56) References Cited

U.S. PATENT DOCUMENTS

| | | | | |
|---|---|---|---|---|
| 3,473,435 | A | * | 10/1969 | Comstock et al. ............ 409/141 |
| 3,504,581 | A | * | 4/1970 | Grabkowski et al. ........... 82/173 |
| 3,744,353 | A | * | 7/1973 | Rohs ............................... 82/118 |
| 3,809,488 | A | * | 5/1974 | Sonderegger ..................... 408/6 |
| 3,872,285 | A | * | 3/1975 | Shum et al. .................... 318/565 |
| 3,967,515 | A | * | 7/1976 | Nachtigal et al. ............... 82/118 |
| 4,047,469 | A | * | 9/1977 | Sakata .......................... 409/132 |
| 4,428,055 | A | * | 1/1984 | Zurbrick et al. .............. 700/160 |
| 4,604,834 | A | * | 8/1986 | Thompson ......................... 451/5 |
| 4,759,243 | A | * | 7/1988 | Thompson .................... 82/1.11 |
| 4,821,460 | A | * | 4/1989 | Wegmann ....................... 451/26 |

(Continued)

FOREIGN PATENT DOCUMENTS
DE 2520946 11/1976
(Continued)

OTHER PUBLICATIONS

Office Action (including translation) of corresponding German Patent Application No. 10-2005-023317.1-14, dated Nov. 11, 2007, 3 pages.

(Continued)

*Primary Examiner* — Erica E Cadugan
*Assistant Examiner* — Jason L Vaughan
(74) *Attorney, Agent, or Firm* — Sheridan Ross P.C.

(57) ABSTRACT

The invention relates to a method for optimizing vibration of a machine tool, in which a driven shaft is rotated, in which a speed range is subsequently passed through, wherein the vibrations occurring in said speed range are sensed and wherein an optimum speed having a minimized vibration is determined and adjusted.

14 Claims, 2 Drawing Sheets

U.S. PATENT DOCUMENTS

| | | | | |
|---|---|---|---|---|
| 4,967,154 | A * | 10/1990 | Marantette | 324/207.12 |
| 5,079,490 | A * | 1/1992 | Kita et al. | 318/569 |
| 5,170,358 | A * | 12/1992 | Delio | 700/177 |
| 5,784,273 | A * | 7/1998 | Madhavan | 700/71 |
| 5,788,432 | A * | 8/1998 | Kihara | 409/131 |
| 6,004,017 | A * | 12/1999 | Madhavan | 700/71 |
| 6,085,121 | A * | 7/2000 | Stern | 700/175 |
| 6,190,098 | B1 * | 2/2001 | Fujita et al. | 409/132 |
| 6,349,600 | B1 * | 2/2002 | Davies et al. | 73/660 |
| 6,367,359 | B1 | 4/2002 | Ropos | |
| 6,810,302 | B2 * | 10/2004 | Darcy et al. | 700/182 |
| 6,993,410 | B2 * | 1/2006 | Esterling | 700/177 |
| 7,065,428 | B2 * | 6/2006 | Baran et al. | 700/174 |
| 7,381,017 | B2 * | 6/2008 | Wang et al. | 409/131 |
| 7,540,697 | B2 * | 6/2009 | Wang et al. | 409/141 |
| 2002/0146296 | A1 * | 10/2002 | Schmitz et al. | 409/131 |
| 2004/0193308 | A1 * | 9/2004 | Darcy et al. | 700/182 |
| 2004/0236529 | A1 * | 11/2004 | Esterling | 702/108 |
| 2005/0021265 | A1 * | 1/2005 | Esterling | 702/76 |
| 2006/0159538 | A1 * | 7/2006 | Wang et al. | 409/131 |
| 2006/0188351 | A1 * | 8/2006 | Wang et al. | 409/141 |
| 2006/0271231 | A1 * | 11/2006 | Olgac | 700/159 |

FOREIGN PATENT DOCUMENTS

| | | |
|---|---|---|
| DE | 2520946 A1 | 11/1976 |
| DE | 137547 | 9/1979 |
| GB | 1217962 A | 1/1971 |
| JP | 2008-229772 A | 10/2008 |

OTHER PUBLICATIONS

Weck, Manfred: Werkzeugmaschinen, Fertigungssystem, vol. 4, 4th edition, 1992, p. 354-355, Item 6.6 Measures for Reducing Chattering (English translation).

Written Opinion (including translation) for International (PCT) Patent Application No. PCT/EP2006/003135, dated Nov. 20, 2007.

International Preliminary Report on Patentability (including translation) for International (PCT) Patent Application No. PCT/EP2006/003135, dated Nov. 23, 2007.

International Search Report prepared by the European Patent Office on Oct. 6, 2006 for PCT/EP2006/003135; Applicant, P & L GMBH & Co. KG.

* cited by examiner

METHOD FOR VIBRATION-OPTIMIZING A MACHINE TOOL

CROSS REFERENCE TO RELATED APPLICATION

This application is a national stage application under 35 U.S.C. 371 of PCT Application No. PCT/EP2006/003135 having an international filing date of Apr. 6, 2006, which designated the United States, which PCT application claimed the benefit of German Application Serial No. 10 2005 023 317.1, filed May 20, 2005, the entire disclosure of each of which is hereby incorporated herein by reference.

FIELD

The invention relates to a method for optimising vibration of a machine tool.

BACKGROUND

In machine tools, in particular for machining workpieces, either the workpiece or the tool is rotated. In case of milling machines, the tool is supported at a driven shaft, whereas, in case of turning machines, the workpiece is respectively rotated.

During high speed processing, speeds in a range of 40000 rpm or more are used. In order to be able to realize the desired precision of processing, it is required to balance the driven shaft as optimal as possible. However, this is not always possible to the desired extent. Rather, minor remaining unbalances may occur, which may e.g. also result from the clamping of the workpiece or the tool. Also the tool or the workpiece itself may contribute to the unbalance.

Due to the existing unbalances, vibrations are generated, resulting in imprecise processing and deteriorated surface qualities. For this reason, vibrations of any kind are not desired when using machine tools.

A beneficial influence on the vibration characteristics may be achieved by a suitable construction of the machine tool itself, of its frame, its machine table or of further components. The suppression of vibrations of rotating components, however, is not possible or only very limited with these means.

SUMMARY

It is an object underlying the invention to provide a method of the aforementioned kind, which enables optimising of the vibration of the machine tool while having a simple structure and a simple and cost-effective application.

According to the invention, the object is solved by the combination of features of the main claim, the sub-claims show further advantageous embodiments of the invention.

According to the invention, it is thus provided that a speed range is selected (either automatically or by a user) which is passed through subsequently, either continuously or stepwise. The vibrations occurring in the speed range are sensed. Then, a speed can be determined, at which an optimised vibration dampening or smallest vibrations, respectively, result. The subsequent processing of a workpiece is then performed at said speed. According to the invention, the speed range being passed through is selected such that the speed predefined on the basis of the processing in view of cutting parameters etc. lies within this range.

According to the invention, it is further provided that the driven shaft is initially rotated with a target speed. Subsequently, the speed is increased and decreased based on the target speed. The speed therefore passes through a predetermined speed range above and below the target speed. Upon passing through this speed range, the occurring vibrations are respectively sensed or determined. Since the vibrations differ strongly within the speed range—also in accordance with resonance vibrations, the innate rigidity of the components or other criteria—an optimum range is obtained within the speed range passed through, in which the occurring vibrations are smaller when compared to the target speed. If the driven shaft is driven with this speed, a significant enhancement of the processing quality may be achieved.

By suitably selecting the speed range by which the speed is increased or decreased based on the target speed, it is possible to further keep the remaining processing conditions in an optimal or appropriate range.

In the inventive method, it is considered that the severity of the vibrations differs dependent on the speed of the rotating shaft. In this context, it has turned out that, in the inventive method, the vibrations are not inevitably increasing with increasing speed. Rather, frequencies are generated in the mechanical structure of the rotating shaft as well as in the machine tool itself, at which resonances occur which amplify the vibration. This turns out to be particularly disadvantageous for the processing of a workpiece, as explained above.

In addition, vibrations cause objectionable noise emissions which should also be reduced.

When using the inventive method, it is thus possible to automatically minimize vibrations and to automatically achieve an optimised vibration characteristic and therewith an optimised processing.

The inventive method may be utilized as follows:

After switching on the drive of a driven shaft and after arriving at the desired target speed (which may be defined manually or by a processing programme), a predetermined speed range around the selected target speed is passed through, either by a user or automatically by the processing programme. This means that a speed range is passed through which is higher or lower than the target speed by a predetermined amount. Therewith, the speed of the driven shaft is respectively decreased or increased with respect to the target speed. It is obvious that the inventive method is not restricted to increasing or decreasing an identical speed amount on the basis of the target speed. It is rather also possible to perform the optimising of the vibration only in one direction, i.e. by only increasing the speed or only decreasing the speed. This depends on the selected processing parameters as well as other conditions. It is also possible to perform the increase or decrease of the speed range with different values.

During the change of the speed as provided by the invention, the severity of the respectively occurring vibration is sensed. Herein, the speed range may be passed through either continuously or stepwise.

The occurring vibrations are sensed in the controller of the tool machine or in a suitable additional apparatus and are compared respectively for the individual speeds. Therewith, it is possible to determine the speed or the speed range, with which or in which the most beneficial vibration values or the most beneficial vibration characteristic are obtained. Based on this speed or speed range, the processing of a workpiece may be performed under optimal conditions.

Since, according to the inventive method, the speed ranges are respectively passed through and are automatically inspected in view of the occurring vibrations, it is automatically possible to avoid resonance vibrations or to suppress same at the best.

It is obvious that, according to the invention, the result of the method will become so much the better, the larger the speed range to be passed through upon increasing or decreasing the speed is. Since same is predefined i.a. by the cutting parameters, the geometry of the workpiece and/or the geometry of the tool, the inventive method provides in an effective manner the possibility of an automated optimising of the vibration for the most different workpieces, tools and processing parameters. According to the invention, it is thus also possible to interrupt the processing step and perform the process of optimising the vibration once more, e.g. in case the machining conditions of a workpiece change in accordance with its geometry.

According to the invention, it may be further advantageous to repeat the method in certain intervals of time in order to compensate for thermal properties and thermal alterations, e.g. due to an internal heating of a motor or bearing, due to which resonance vibrations may occur. In this context, it may also be preferred to perform the inventive method only if a static condition is achieved in view of the thermal load of the machine tool.

The inventive method may be performed by means of a suitable sensor, e.g. an acceleration sensor. Same may be attached e.g. in the region of the driven shaft, e.g. at a component which is movable in the movement axis of the driven shaft. It is for example possible to attach the sensor at the bearing housing of a tool spindle.

In a further preferred embodiment of the invention, at least one position sensor of the machine tool is used, which also serves to control the movements of the individual components of the machine tool (movements along the X, Y and Z axes). Machine tools, in particular those machine tools used in machining centers, generally comprise a plurality of movement axes in order to realize relative movements between the tool and the workpiece. The movements along said axes are performed in a controlled manner. In order to detect the positions of movements of the individual axes, measuring sensors are provided, e.g. glass yardsticks in case of linear axes. The actual position at the respective movement axis is detected by means of these measuring sensors. The machine tool moves the respective axes to the desired target positions by compensating the difference between the actual position and the target position for the individual axes.

In order to sense the occurring vibrations and to perform an optimising of the vibration according to the invention, it is in a particularly simple way possible to use the signals of one or more measuring sensors in the movement axes of the machine tool also for the inventive method. Therewith, vibrations may be detected, in particular vibrations of the driven shaft carrying the tool or the workpiece. Said vibrations may consequently be sensed by means of the measuring sensor. In this context, there result e.g. minor deviations of the position signal. Dependent on the severity of the vibration, also the deviation of the position signal changes accordingly. It is obvious that an optimisation of the inventive method is in particular possible if no further movements along the movement axes of the machine tool are performed.

According to the invention, it is therewith not required to install a plurality of additional sensors. Rather, the already existing measuring sensors may be used for the inventive method. As a result, a significant reduction of costs is achieved.

In case of specific processing steps for workpieces, the speed of the workpiece or the tool is exactly adjusted to the feed rate of the respective movement axes or infeed axes, in order to realize a specific infeed, e.g. per tooth or cutting edge of the tool. Changes of the speed by using the inventive method therefore also result in a change of the feed rates of the movement axes. In a preferred further development of the inventive method, it is provided that also the feed rates are automatically adjusted as soon as the speed has been changed for optimising the vibration, in order to adjust the processing step.

Since the individual movement axes of a machine tool are influenced differently by the occurring vibrations, it may be advantageous for the inventive method to include multiple, i.e. more than one measuring sensor for the analysis of the vibration severity. In case of a portal milling machine, e.g. the vertical movement axis and the upper horizontal movement axis, which move the spindle, are influenced by the vibrations. Therefore, the signals of the two assigned measuring sensors are particularly suited to detect the occurring vibrations. In case of a portal machine, it is therefore preferred to consider both signals (horizontal movement axis and vertical movement axis). In some types of tool spindles, the vibration characteristics may change. Same may be more pronounced in the vertical direction or the radial direction, dependent on the speed and the further parameters. Also this influences the recording of measuring values. Also these influencing factors may be optimised by using the inventive method.

BRIEF DESCRIPTION OF THE DRAWINGS

In the following, the invention is described on the basis of an embodiment in combination with the drawing, wherein.

DETAILED DESCRIPTION

Figure 1:
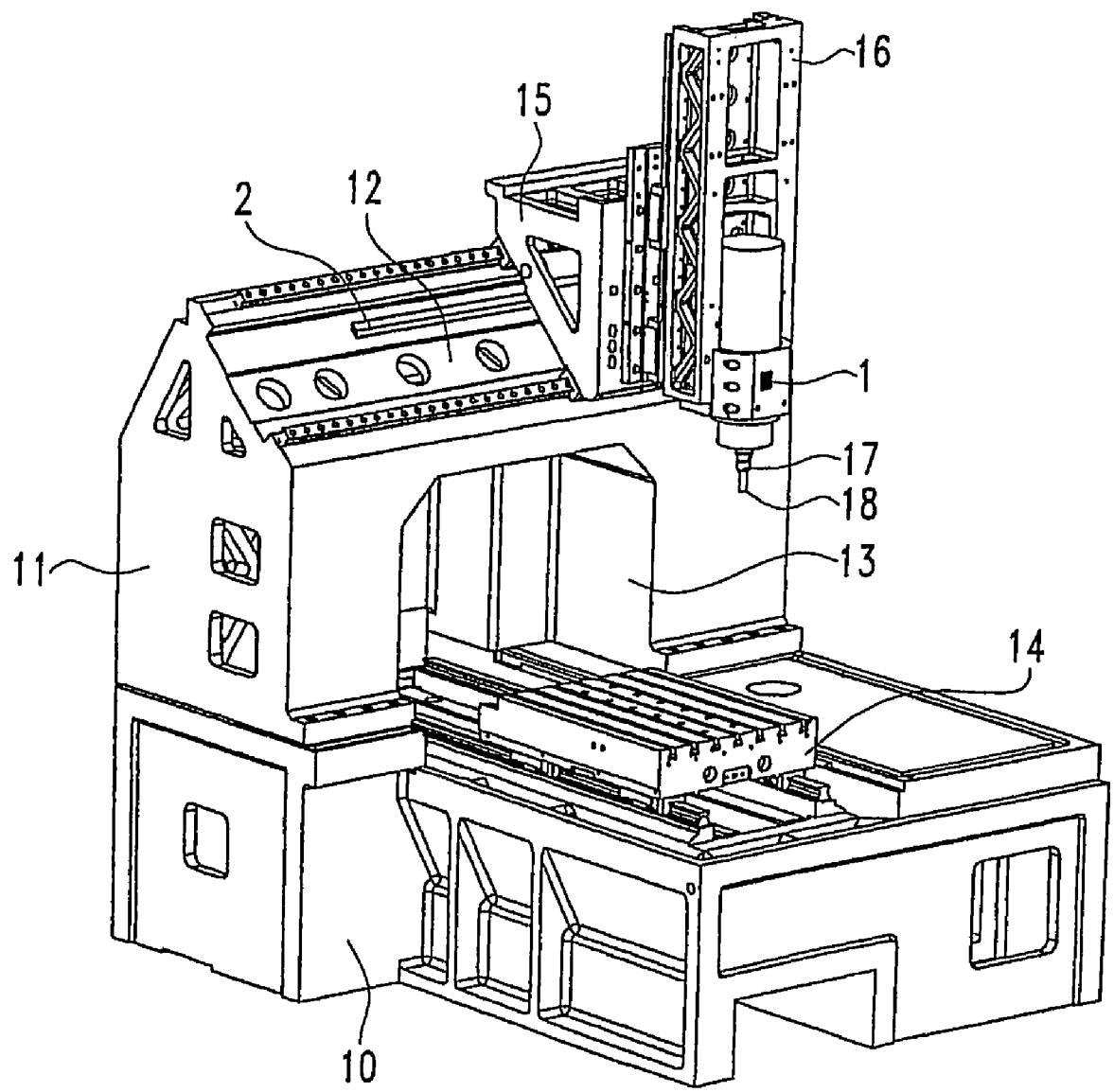
FIG. 1 shows a simplified perspective front view of a machine tool.

FIG. 1 shows a machine tool comprising a machine table 10, onto which a portal 11 having a cross member 12 is attached. In a working space 13 formed by the portal 11, a slide carriage 14 may be moved along a horizontal movement axis. A cross slide 15 may be moved along a further horizontal axis relative to the cross member 12. The cross slide 15 carries a vertical carriage 16 at which a spindle 17 is supported, the spindle forming a rotatable shaft, at the end of which a tool 18 is attached. The illustration of the fixation of a tool at the slide carriage is omitted for the sake of simplification. The basic structure of a machine tool is known from the state of the art, such that further explanations may here be omitted.

In the shown embodiment, a sensor 1 is attached at the housing of the spindle 17, the sensor serving to detect vibrations of the spindle 17.

Reference numeral 2 designates a measuring sensor which is provided at the cross member 12 in order to detect horizontal movements of the cross slide 15 and to control the cross slide 15. Occurring vibrations may therefore be directly detected by changes of the position signal of the measuring sensor 2, e.g. directly as vibrations or at least as an amplified noise.

Figure 2:
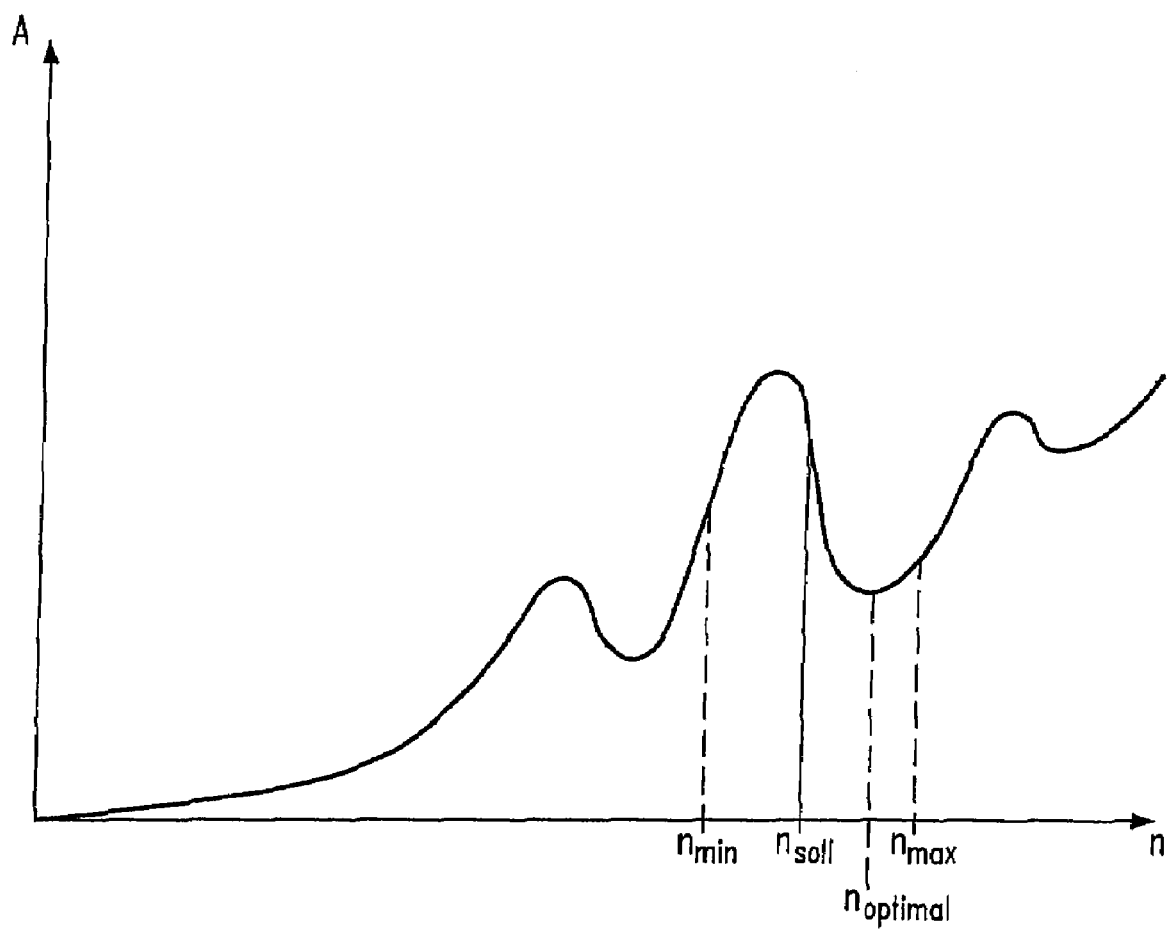
FIG. 2 shows a diagram of the vibration amplitude in accordance with the speeds.

FIG. 2 shows a diagram of the vibrations (amplitude) A in accordance with the speed n of the spindle 17. According to the invention, the spindle 17 is initially set to speed $n_{SOLL}$. According to the invention, the speed is then increased or decreased by a predetermined value. The limits of the increase or decrease are given by the values $n_{MAX}$ or $n_{MIN}$, respectively. As may be derived from FIG. 2, a gradient of the vibration amplitude results across the speed range. This range has its minimum value at the speed $n_{OPTIMAL}$. This is the optimal speed value which is adjusted with the inventive method and at which optimised vibration characteristics are present.

LIST OF REFERENCE NUMERALS

1 sensor
2 measuring sensor
10 machine table
11 portal
12 cross member
13 working space
14 slide carriage
15 cross slide
16 vertical carriage
17 spindle
18 tool

What is claimed is:

1. A method for optimizing vibration of a machine tool;
    wherein a driven shaft, provided on a slide for linearly moving the driven shaft so as to achieve relative movement between a workpiece and a tool in order to perform a processing operation on the workpiece, is rotated with a target speed;
    wherein a processing step is interrupted;
    wherein no movements of the driven shaft, other than the rotation, are performed;
    wherein the target speed is subsequently automatically increased and/or decreased by at least one predetermined value;
    wherein vibration occurring in a speed range between the target speed and a speed selected to be higher and/or lower than the target speed is sensed
    wherein a measuring sensor is provided on a frame member of the machine tool in order to detect the linear movement of the slide;
    wherein the vibration is detected as changes in the position signal of the slide by the measuring sensor;
    wherein an optimized speed is determined utilizing the changes in the position signal;
    wherein the optimized speed is the speed within the speed range at which the vibrations are minimized; and
    wherein the processing of a workpiece is subsequently performed with the driven shaft rotating at the optimized speed.

2. The method of claim 1, wherein the speed range having the higher or lower speed is continuously passed through.

3. The method of claim 1, wherein the speed range having the higher or lower speed is passed through stepwise.

4. The method of claim 1, wherein the method is repeated in predetermined intervals upon an interruption of the processing.

5. The method of claim 1, wherein at least one sensor is used in conjunction with the measuring sensor for determining the vibrations.

6. The method of claim 1, wherein an infeed motion of a movement axis of the machine tool is also adapted to operate with the driven shaft operating at the optimized speed.

7. The method of claim 1, wherein the optimized speed is determined by the amplitude of the vibration measured by the measuring sensor.

8. The method of claim 1, wherein the optimized speed is determined by signal change provided by the measuring sensor.

9. The method of claim 1, wherein the method is repeated in predetermined time intervals.

10. The method of claim 1, wherein the method is repeated upon a change of the processing parameters of a workpiece.

11. A method for vibration optimizing a machine tool, comprising:
    rotating a driven shaft at a target speed;
    wherein the driven shaft, is provided on a slide for linearly moving the driven shaft so as to achieve relative movement between a workpiece and a tool in order to perform a processing operation on the workpiece,
    at least one of increasing the speed of the driven shaft above the target speed and decreasing the speed of the driven shaft below the target speed,
    wherein the speed of the driven shaft is moved through a predetermined speed range;
    while the speed of the driven shaft is moved through the predetermined speed range, sensing vibration;
    wherein a measuring sensor is provided on a frame member of the machine tool in order to detect the linear movement of the slide;
    wherein the vibration is sensed as changes in the position signal of the slide by the measuring sensor;
    utilizing changes in the position signal to determine an optimum speed for the driven shaft, wherein the vibration at the optimum speed is smaller than the vibration at the target speed; and
    wherein the processing of a workpiece is subsequently performed with the driven shaft rotating at the optimum speed.

12. The method of claim 11, wherein the predetermined speed range includes speeds above and below the target speed.

13. The method of claim 11, wherein the predetermined speed range includes speeds below the target speed.

14. The method of claim 11, wherein the predetermined speed range includes speeds above the target speed.

* * * * *